United States Patent [19]
Dötzel et al.

[11] Patent Number: 6,016,217
[45] Date of Patent: Jan. 18, 2000

[54] MICRO SWIVEL ACTUATORS AND A PROCEDURE FOR THE PRODUCTION OF THE SAME

[75] Inventors: Wolfram Dötzel; Thomas Gessner; Ramon Hahn, all of Chemnitz; Christian Kaufmann, Burgstädt; Heinz-Ulrich Löwe, Niederwiesa; Joachim Markert, Chemnitz; Manfred Rauch, Chemnitz, Kristina Rauch, Andreas Rauch, legal representatives; Udo Wollmann, Chemnitz, all of Germany

[73] Assignee: CMS Mikrosystene GmbH Chemnitz, Chemnitz, Germany

[21] Appl. No.: 08/983,119

[22] PCT Filed: Jun. 26, 1996

[86] PCT No.: PCT/DE96/01177

§ 371 Date: Jul. 20, 1998

§ 102(e) Date: Jul. 20, 1998

[87] PCT Pub. No.: WO97/02506

PCT Pub. Date: Jan. 23, 1997

[30] Foreign Application Priority Data

Jun. 30, 1995 [DE] Germany .......................... 195 23 886
Dec. 20, 1995 [DE] Germany .......................... 195 47 584

[51] Int. Cl.$^7$ .................................................. G02B 26/08
[52] U.S. Cl. ........................ 359/292; 359/290; 359/291; 359/295; 359/298
[58] Field of Search .................................. 257/254, 415, 257/909; 359/223, 290, 291, 292, 298, 295; 438/29

[56] References Cited

U.S. PATENT DOCUMENTS 5,629,790 5/1997 Neukermans et al. ................ 359/198
5,673,139 9/1997 Johnson ................................ 359/291

FOREIGN PATENT DOCUMENTS 0040302 11/1981 European Pat. Off. .
0463348 1/1992 European Pat. Off. .
0469293 2/1992 European Pat. Off. .
298856 3/1992 Germany .
4224559 2/1994 Germany .

OTHER PUBLICATIONS

"Digital micromirror array for projection TV" by Michael A. Mignardi, Solid State Technology, Jul. 1994, pp. 63–64.
"Line–Addressable Torsional Micromirros for Light Modulator" by V.P. Jaecklin et al., Sensors and Actuators A. vol. A41, Apr. 1, 1994, No. 1/03, pp. 324–329, XP00450049.
"A silicon Light Modulator" by K. Gustafsson et al. Journal of Physics E. Scientific Instruments, vol. 21, No. 7, Jul. 1998, pp. 680 685, XP000005638.
"Micromechanical Light Deflector Array" by K.E. Petersen, IBM Technical Disclosure Bulletin, vol. 20, No. 1, Jun. 1977, New York, USA, pp. 355–356, XP002015961.
"Color Projection Display System Using Silicon Micromecanics" by A.M. Harstein, IBM Technical Disclosure Bulletin, vol. 22, No. 12, May 1980, New York, USA, pp. 5575–5575, XP002015962.
"Deformable–Mirror Spatial Light Modulators" by L.J. Horbnbeck, Spatial Light Modulators and Applications III, vol. 1150, Aug. 7–8, 1989, San Diego, USA, pp. 86–102, XP000351394.

*Primary Examiner*—Scott J. Sugarman
*Assistant Examiner*—Margaret Burke
*Attorney, Agent, or Firm*—Horst M. Kasper

[57] ABSTRACT

The invention refers to micro swivel actuators and a procedure for the manufacturing of the same. The micro swivel actuators consist basically of a semiconductor wafer equipped with three layers, which contains on the one hand individual mirrors with integrated springs and support elements as mechanical components and on the other hand electrodes, feeder lines and electrical contacts as electrical arrangements. The manufacturing of the micro swivel actuators utilizes procedure steps from the field of surface micromechanics, so that well-tried technologies are being applied. The micro swivel actuators, especially the micromechanical mirror arrays, are in particular suited for applications in the pictorial reproduction technique via laser beam. With these actuators, a laser beam can be directed by turning several parallel triggered individual mirrors.

18 Claims, 7 Drawing Sheets

MICRO SWIVEL ACTUATORS AND A PROCEDURE FOR THE PRODUCTION OF THE SAME

BACKGROUND OF THE INVENTION

The invention refers to micro swivel actuators and a procedure for the production of the same.

A multitude of micromechanical actuators, which aim at defined deflection of light beams by means of a mirror arrangement, is known in the literature.

An electrostatic deflector unit is described in the DE 42 24 599. The basis is a platelike swiveling element, which was reduced in mass either by realization in a sandwich structure or by recesses between remaining weblike areas. Suspension is provided by two flectional beams fitted in diagonally opposing corners. This element is held in a frame. The DD 298 856 two-dimensional micromechanical moving device contains another solution. The swivel plate is here centrically arranged on a point, which is located on a baseplate and is kept in the initial state parallel to the baseplate with four spring elements. The entire device is again arranged in a frame.

These solutions include individual tilting attachments, which are therefore limited in their use by the determined tilting surface. Furthermore, a relatively large area is being tilted, which results in another limitation in dynamics.

The EP 0 040 302 contains an optical beam deflector unit. A platelike deflector unit made of silicon is here electrostatically tilted with two one-sided torsion springs towards a baseplate. Moreover, this platelike deflector unit is preceded by parallel or non-parallel multiple arrangements, each of which is tightly enclosed by the frame.

The disadvantage here is again the large-surface realization of the tilting attachment. The result is limited dynamics. Solutions without a frame can be found in EP 0 463 348 bistable DMD trigger circuit and trigger mode and EP 0 469 293 multilayer ductile mirror structure. Platelike mirrors are here tilted around the axis of symmetry.

The disadvantage of these solutions is a large mass and a high mass moment of inertia with regard to the geometrical axis. The preparation of a mirror array is described in the journal Sensors and Actuators, Vol. A 41 complete (1994), pages 324–329, "Lineaddressable torsional micromirrors for light modulator arrays." In order to achieve the base distance between the lower edges of the mirror and the electrodes, a sacrificial layer of silicon dioxide is applied after the production of the electrodes. Windows are etched in this sacrificial layer to mechanically fasten the springs, which enable the excursion of the mirrors on the substrate. The following separation of polysilicon therefore creates a layer which is in part directly connected with the substrate. The mirrors are then formed in those areas of the polysilicon layer that are lined with the sacrificial layer. Afterwards an aluminum layer is applied as reflector. Wet-chemical etching of the sacrificial layer is the last step in the manufacturing process. An overall coverage of mirror arrangement is not achieved.

The described surface technique utilizes a polysilicon layer for the actuators.

A development of Texas Instruments Inc. is presented in the journal Solid State Technology, July 1994, pages 63–68, "Digital micromirror array for projection TV." The array was especially designed for TV applications and consists of a matrix of 768×576 individual mirrors. The base distance between the mirrors and the electrodes is here implemented by an organic sacrificial layer, which is spun-on and then leveled to smooth out any unevenness created by underlying structures (electrodes). Mirrors as well as the springs are made of an aluminum alloy. Special posts are designed to support the springs towards the substrate. These posts are created by filling small holes in the sacrificial layer with the mentioned alloy. Following the decollation of the chips, the sacrificial layer is removed by plasma etching.

The described arrangements allow only two conditions for the mirrors (home position or else maximum excursion).

The invention mentioned in the patent claims 1 and 14 takes the problem of creating a micromechanical mirror array, featuring high attainable frequency of resonance and at the same time a large active total surface as a basis. This is to be realized by a procedure using fewer technological procedure steps.

This problem is solved with the characteristics described in the patent claims 1 and 14.

The special advantages achieved with this invention are that for one, a semiconductor wafer furnished with two layers of different etching characteristics contains all elements of preferably one mirror array, on the one hand by means of flexible, one-piece bandlike electrodes which are arranged parallel to each other, with integrated springs and supporting elements; and on the other hand by means of electrical arrangements of electrodes, feeder lines and bondpads, among others, without an existing conventional structure of assembled single layers.

The use of monocristalline silicon for the flexible electrodes enables the application of well-known and well-tried procedures of microelectronics. At the same time this results in high endurance of the springs.

The division of the entire tilting surface into flexible, one-piece bandlike electrodes, which are arranged parallel to each other, leads to an increase in the dynamics of the positioning processes due to the reduced masses and thus the lower angular momentum with regard to the swiveling axis. Furthermore, lower field intensities per flexible, one-piece bandlike electrodes, which are arranged parallel to each other, are necessary for moving.

The oxide layer directly on the semiconductor wafer constitutes a sacrificial layer. Therefore the forming of the support elements does not require any additional technological processes since these can be formed directly from the oxide layer by partial etching. This also makes the support elements self-adjusting with regard to the longitudinal axis of the mirror. The result is an even surface level of the support elements and therefore as well of the individual mirrors. Deformation and thus a falsification of the positioning result is prevented to a great extent. At the same time an interruption of the springs running inside the mirror is avoided, which also adds to the improvement of the properties. The second layer on the oxide layer is another insulation layer, which serves as carrier for the electrical arrangements so that with a turn of this semiconductor wafer the unevenness due to the forming of the electrodes of conventional micromechanical mirror arrangements becomes irrelevant.

The mechanical components are preferably made of monocristalline silicon, which is especially remarkable for its freedom from fatigue symptoms. Compared with polycristalline material, this enables almost unlimited durability of the mechanical components despite dynamic operation.

The individual flexible, one-piece bandlike electrodes, which are arranged parallel to each other, can be moved independently, so that with a formation of these electrodes as mirrors, the reflected beam is not only deflected, but can also be either focused or expanded. Furthermore they can be triggered analogously and therefore perform any moving function (among others sine, saw-tooth, triangle) around their longitudinal axis.

The use of narrow mirror surfaces as flexible, one-piece bandlike electrodes, which are arranged parallel to each other, enables the realization of bigger deviation angles than with the use of large-surface tilting mirrors with the same distance between the bottom edge of the mirror and the base frame. The narrower these electrodes can be formed, the bigger the possible deviation angles.

The arrangement of several micromechanical mirror arrays in one line or matrix enables a large surface deviation of beams combined with high dynamics.

The micromechanical mirror array is especially suited for applications in the pictorial reproduction technique via laser beam. A laser beam can here be directed with the turning motion of several parallel triggered individual mirrors. In order to achieve the high frequencies of resonance, the micromechanical mirror array with a large optically effective surface is composed of several parallel arranged individual mirrors of minor width and mostly of approximately the same length. The characteristic parameters of the arrangement, like frequency of resonance and deviation angle, are determined by the dynamic and static properties of the many small individual mirrors. The production of the micromechanical array utilizes procedure steps from the surface micromechanics, so that well-tried technologies are applied. This enables a production of these arrangements with existing facilities.

Favorable designs of the invention are mentioned in the patent claims 2 through 13 and 15 through 18.

The motions of the flexible, one-piece bandlike electrodes, which are arranged parallel to each other, have to be realized with the use of differently designed springs as swivel bearings according to further developments of the patent claims 2 through to 5. The use of a one-sided torsion spring according to the further development of patent claim 3 leads to a swivel bearing, allowing a motion of the electrode with the least possible expenditure of energy.

The further developments according to the patent claims 6 through 13 show functional realization alternatives. The use of reflection-reducing glass enables the use as deflection mirror unit.

The further development according to the patent claims 13, 16 and 17 allows the separation for the purpose of decollation of the micro swivel actuators from the wafer compound, since the semiconductor wafer is hermetically sealed by the glass wafer. This measure enables an effective mass production.

The further development according to patent claim 15 leads to an increase of the oxide layer as sacrificial layer, so that higher deflection angles can be obtained.

BRIEF DESCRIPTION OF THE DRAWINGS

A design example of the invention is shown in the drawings and is described in the following. The drawings show in.

DETAILED DESCRIPTION

Figure 1:
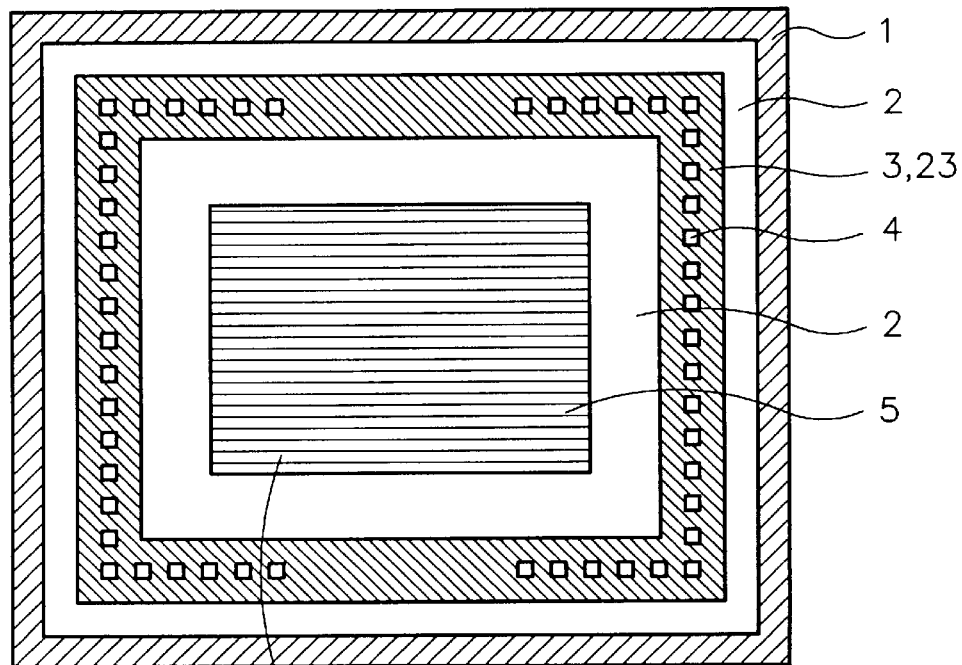
FIG. 1 the micro swivel actuator, top view.
Figure 4:
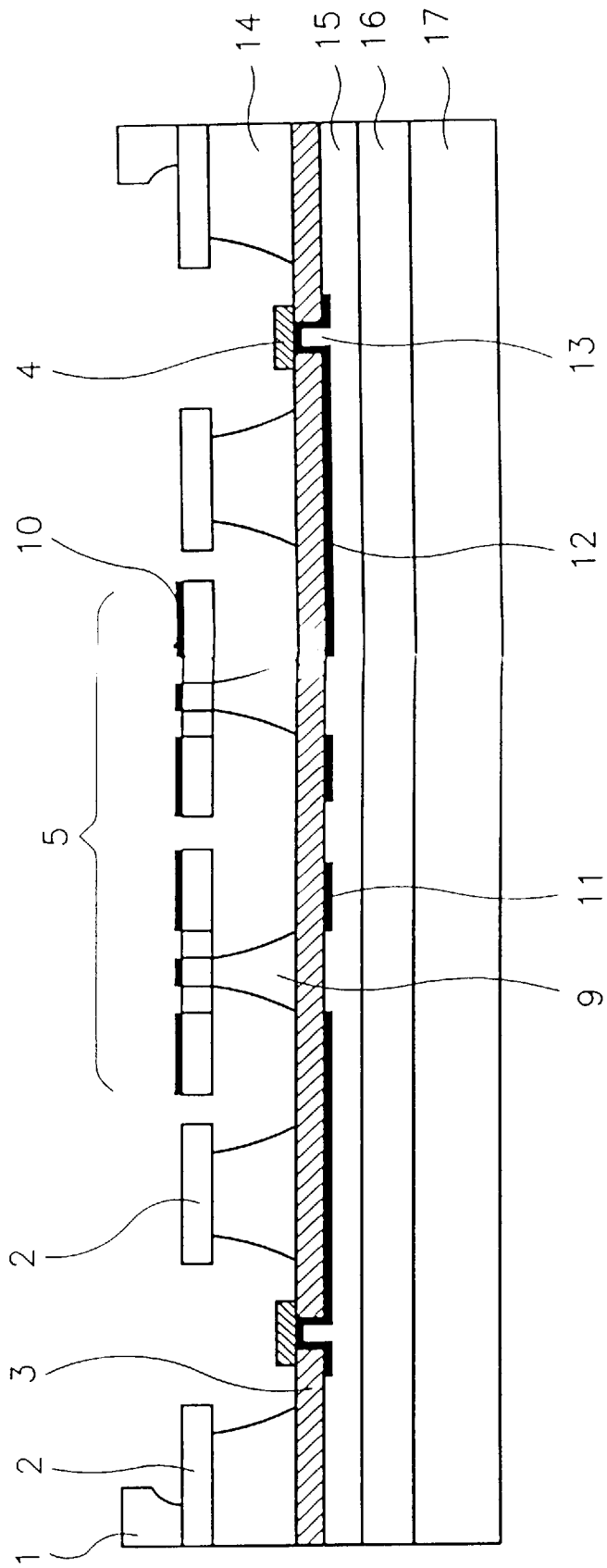

The basis of the micromechanical mirror array (5) according to the representations in FIGS. 1 and 4 is a semiconductor wafer (2) furnished with two layers. There is a layer sequence semiconductor wafer (2) of monocristalline silicon, oxide layer (14) of silicon oxide and insulation layer (3) of silicon nitride.

Figure 2:
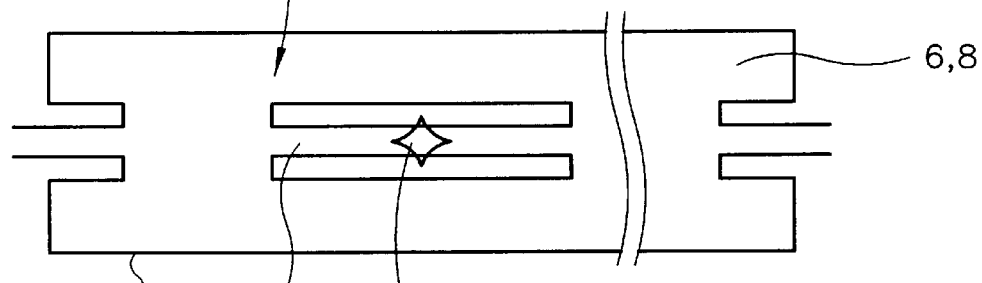
FIG. 2 a cut-out of a flexible, one-piece bandlike electrode with a supporting element and a double-sided torsion spring, FIG. 3 an exploded view of FIG. 2, FIG. 4 a schematic representation of a cross section of the micro swivel actuator, FIGS. 5*a–e* variants of swivel bearings, FIG. 6 a representation of the partial etching of the oxide layer for the purpose of formation of the supporting elements and FIGS. 7, 8, 9, 10, 11, 12, 13 and 14 principle representations of procedure steps for the production of the micro swivel actuator.

This coated semiconductor wafer (2) itself represents the elements flexible, one-piece bandlike electrodes (8), which are arranged parallel to each other, realized as individual mirror (6) with integrated springs (7) according to FIG. 2 of monocristalline silicon, supporting elements (9) according to the number of integrated springs (7) of silicon oxide (FIG. 3) and electrical insulation layer (3) for the insulation of the electrical contact structure of silicon nitride of the micromechanical mirror array (5).

Figure 5A:
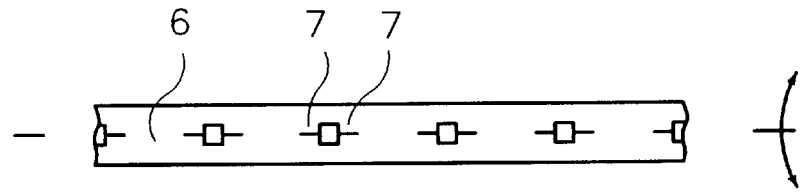
Figure 5B:
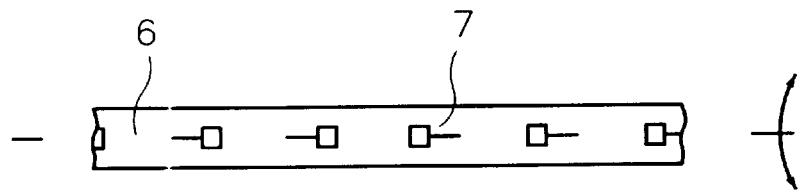
Figure 5C:
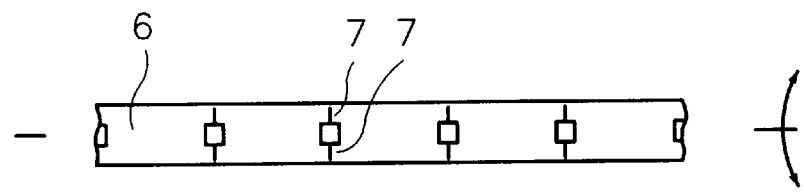
Figure 5D:
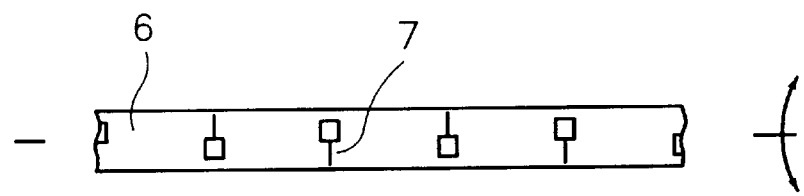
Figure 5E:
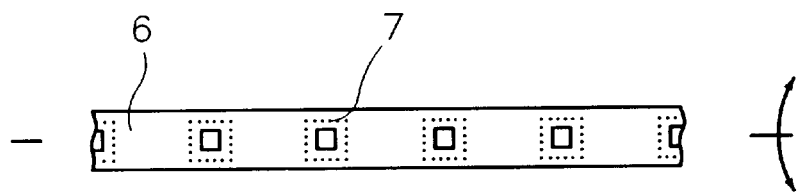

The individual mirrors (6) are provided with a reflection layer (10) of aluminum. The reflection layers (10) of these individual mirrors (6) are connected with each other via line structure on the carriers surrounding the individual mirrors (6). So the individual mirrors (6) are also the flexible, one-piece bandlike electrodes (8), which are arranged parallel to each other. According to the representation in FIGS. 2 and 5*a* the springs (7) are formed as double-sided torsion springs integrated in longitudinal direction of the individual mirrors (6).

One support element (9) is arranged in each center of the double-sided torsion springs. This enables a tilting motion of each individual mirror (6).

The insulation layer (3) bears on the opposing side of the individual mirrors (6) the electrodes (11), electrical feeder lines (12) and bondpads (4), made of aluminum.

The electrodes (11) are arranged corresponding to the individual mirrors (6). The number of electrodes (11) corresponds to the number of individual mirrors (6) in a ratio of 2 to 1. Therefore, the electrodes, which run parallel to each other, enable an electrostatic triggering of the individual mirrors (6). A tilting of the individual mirrors (6) around the support element is possible with the arrangement of two electrodes (11) per individual mirror (6) and a reciprocal triggering.

This structure is located on another semiconductor (17) which is provided with an oxide layer (16) and serves as carrier for this entire structure. Another insulation layer (15) serves as connecting level as well as to balance the difference in altitude between the electrodes (11) and the feeder lines (12). In order to guarantee the decollation of the micromechanical mirror arrays (5), the semiconductor wafer (2) is covered by a glass wafer (1) as cover plate. This glass wafer is designed to either stay on the micromechanical mirror array (5) after decollation or to be removed from the mirror array (5) in sheets through integrated predetermined breaking points (26). In the first case, the feeder lines (12) can be contacted from outside, and the inner part of the glass window (28) of the glass wafer (1) is thinned to the extent that the individual mirrors (6) can be adjusted to the tilting limit, and the glass wafer is of reflection-reduced glass.

More design examples result from the various design alternatives of the individual components.

FIG. 5 shows a selection of possible designs of the springs. These can be realized as one-sided (FIG. 5b) and double-sided (FIG. 5a) torsion springs, single (FIG. 5d) and double (FIG. 5c) coil springs and membrane, flat coil or cross-shaped springs (schematically represented in FIG. 5e).

The one-sided torsion springs, the one-sided coil springs or the flat coil springs have proven to be the most convenient variants, because they require only one flectional beam.

The procedure for the manufacturing of the micro swivel actuator is further illustrated in the representations of FIGS. 7 through 14. In order to achieve a thickness of the oxide layer (14) as sacrificial layer which guarantees a high excursion of the individual mirrors (6) and is technically reasonable, two semiconductor wafers are furnished with 1.65 μm silicon oxide each by thermal oxidation and are then bonded together in a silicon fusion bond process (SFB). One of these two semiconductor wafers is then removed in a KOH caustic bath. This creates a semiconductor wafer (2) with an oxide layer (14) of 3.3 μm accordance with the rial layer.

Figure 7:
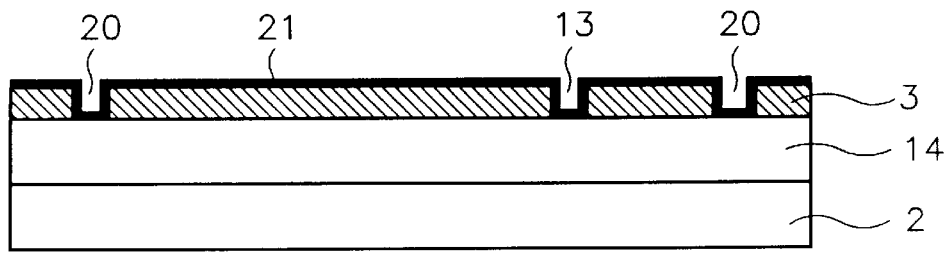

In accordance with the representation of FIG. 7, the semiconductor wafer (2) is then provided with an insulation layer (3) of silicon nitride of 350 nm thickness. During the etching of the oxide layer (14), this insulation layer (3) serves as etching barrier layer. The following is a photolithographic process which together with a plasma etching step leads to the formation of the windows (13 and 20) in the insulation layer (3). Four of these windows (20) on the edge of the semiconductor wafer (2) serve the formation of adjustment marks (22), while the windows (13) serve the realization of the bondpads (4). Then an electrically conducting layer (21) of 300 nm thickness consisting of a molybdenum-silicon compound is sputtered.

Figure 8:
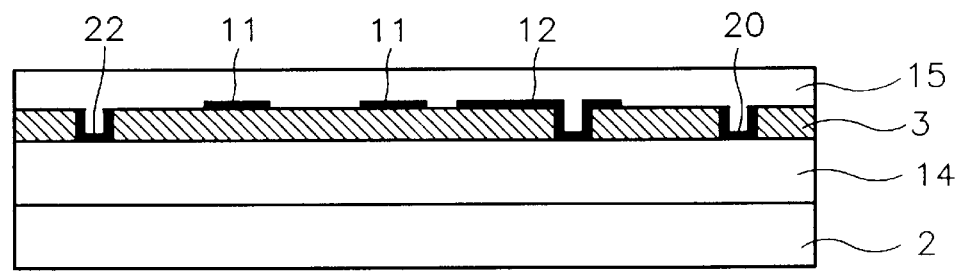

The structures for the electrodes (11) and the feeder lines (12) to the bondpads (4) are transferred to the electrically conducting layer (21) by a photolithographic process and a plasma etching step. After structuring, the sputtered molybdenum-silicon compound is converted in a silicide phase with low electrical resistance by tempering. Then follows a CVD process with which another insulation layer (15) in the form of a silicon dioxide layer of 200 nm thickness is deposited as shown in FIG. 8. This insulation layer (15) together with the oxide layer (16) of the semiconductor wafer (17) serves as insulator between the electrodes (11) and the semiconductor wafer (17) which serves as carrier.

Figure 9:
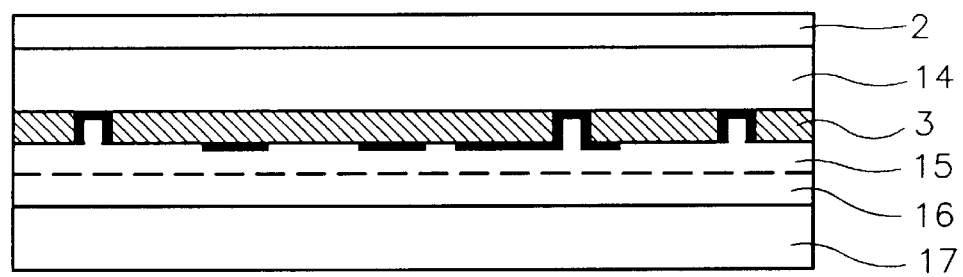
Figure 10:
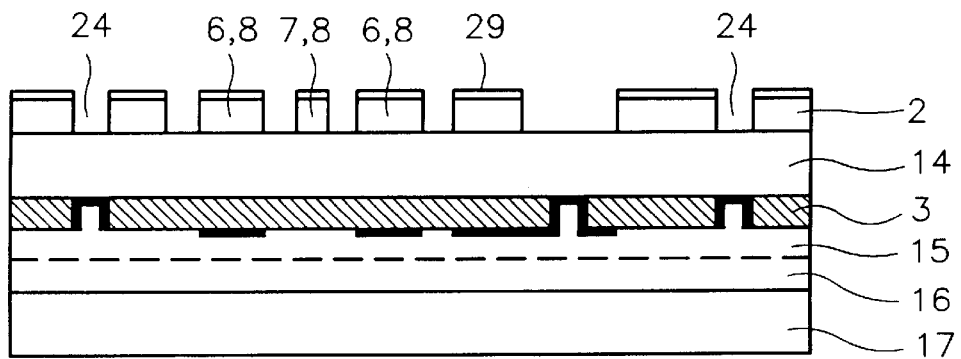
Figure 11:
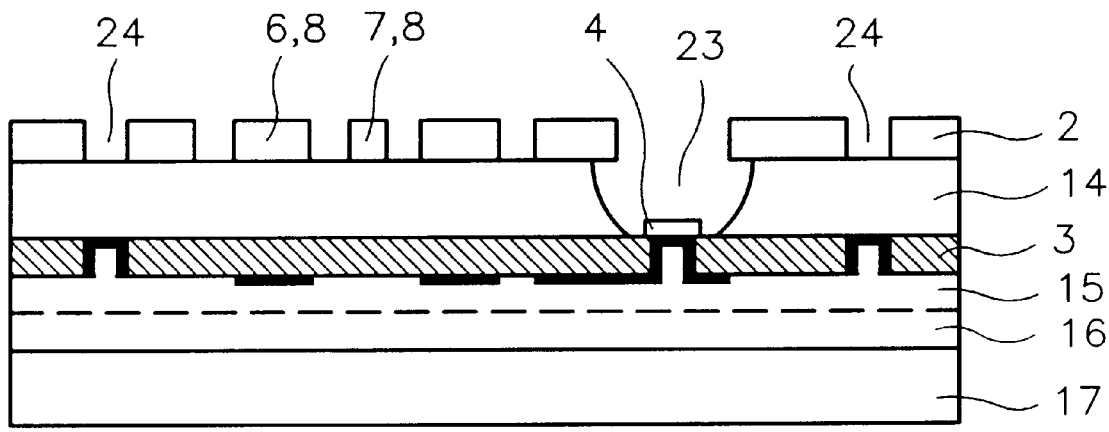
Figure 12:
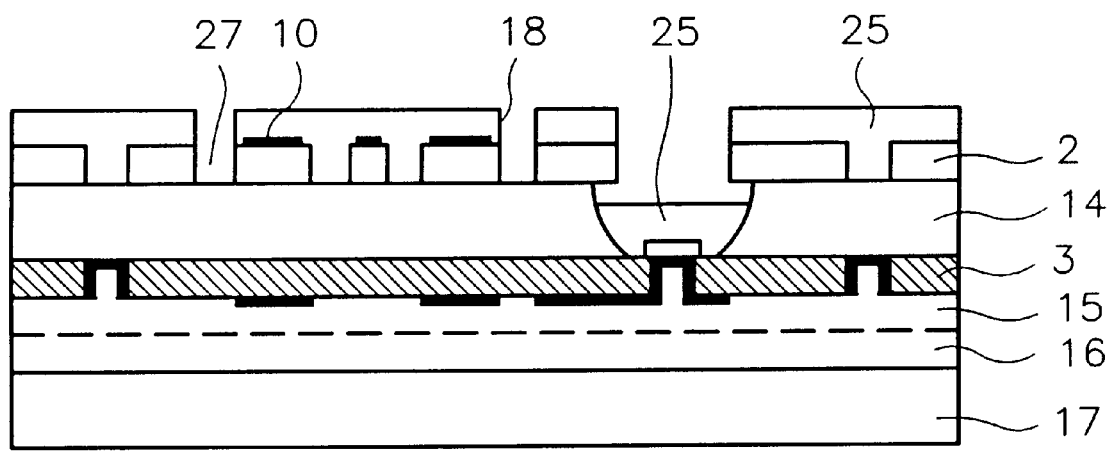

The semiconductor wafer (2) prepared in this way is reversed and attached to the semiconductor wafer (17) by a silicon fusion bond process as shown in FIG. 9. This semiconductor wafer (17) was previously furnished with an oxide layer (16) of silicon dioxide of 1 μm thickness by thermal oxidation. After thinning of the semiconductor wafer (2), this compound guarantees the mechanical stability of the system. Reversing the semiconductor wafer (2) makes the unevenness that was created by the structure of the insulation layer (3) and the electrically conducting layer (21) for this formation irrelevant. The silicon layer of the semiconductor wafer (2) is thinned down to a thickness of up to 3.2 μm by a chemical mechanical polishing (CMP) or another suitable process (e.g. electrochemical etching barrier). The following thermal oxidation creates an oxide layer of 400 nm thickness. This layer serves as auxiliary mask (29) for the structuring of the individual mirrors (6) in the silicon layer of the semiconductor wafer (2). At first, the windows (24) on the edge of the semiconductor wafer (2) are created by a photolithographic process in combination with an oxide and silicon etching step. The previously prepared adjustment marks (22) can be seen through these windows (24). By this measure, a mask for the structuring of the individual mirrors (6) can be adjusted to the electrodes (11) without multiple application of the double-sided lithography. The structuring of the oxide layer is followed by a plasma etching step with which the actual formation of the individual mirrors (6) in the silicon layer of the semiconductor wafer (2) is done according to FIG. 10. The semiconductor wafer (2) is then protected with photosensitive resist in a photolithographic process except for the area of the bondpads (4). The following wet etching removes the oxide layer (14) in the area (23) of the bondpads (4). Another wet etching step after removing the varnish removes the 400 nm thick mask. Then an aluminum layer of 1 μm thickness is sputtered. According to FIG. 11, the bondpads (4) are created in another photolithographic process in combination with an etching step. Another aluminum layer of 100 nm thickness is sputtered after formation of the bondpads (4). This functions as reflection layer (10). The structuring of the reflection layer (10) is done in a plasma etching step which aims at slightly undercutting an applied varnish mask. The offset created between the aluminum layer and the edges of the individual mirrors (6) together with a later applied mask (25) offers full protection of the reflection layer (10) in the following etching process as represented in FIG. 11.

Figure 6:
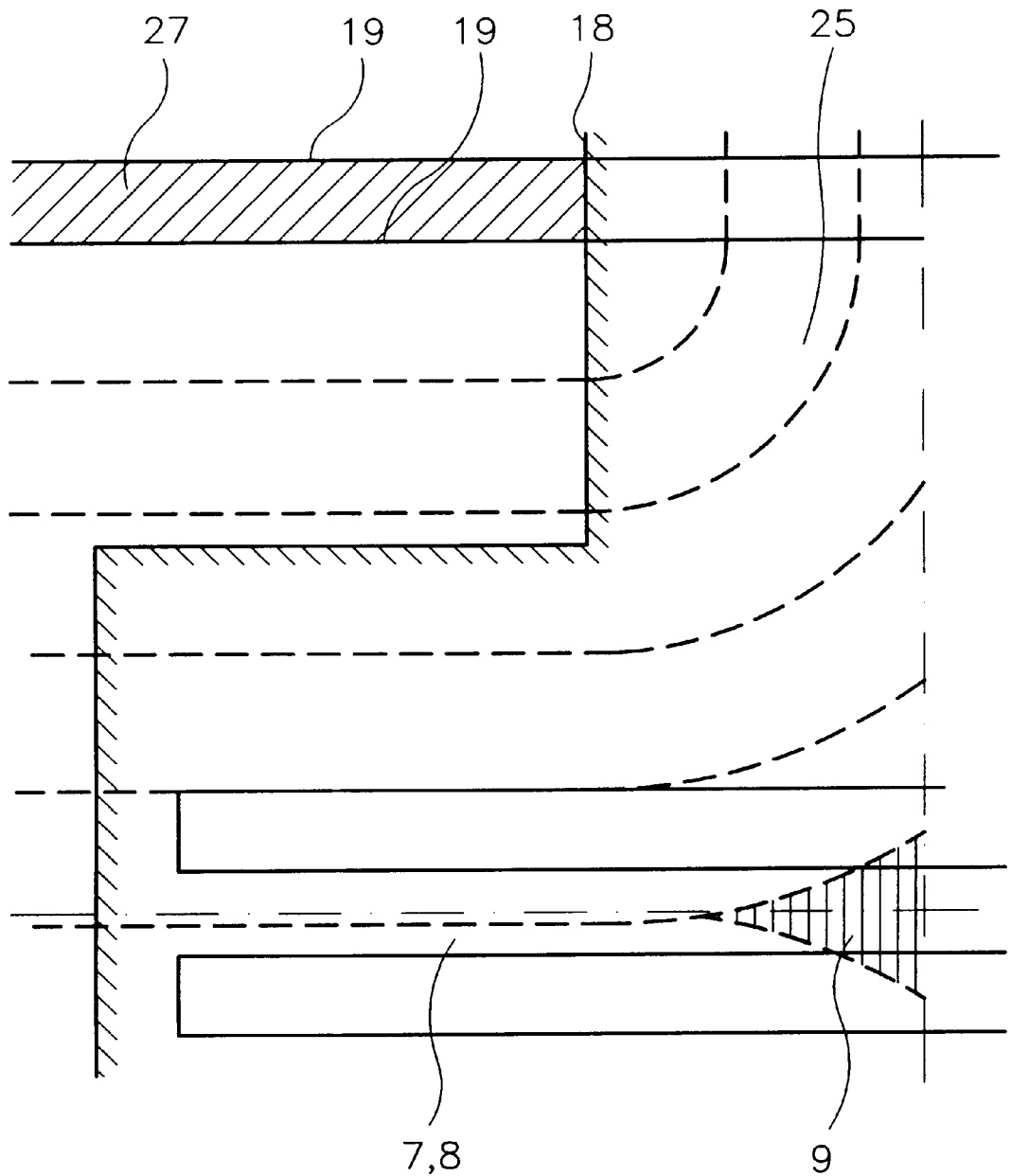

According to FIG. 6, the support elements (9) are formed with this mask (25) during the etching of the oxide layer (14). These elements support the spring (7) inside the individual mirrors (6) towards the insulation layer (3) and enable the necessary excursion of the individual mirror (6).

Figure 3:
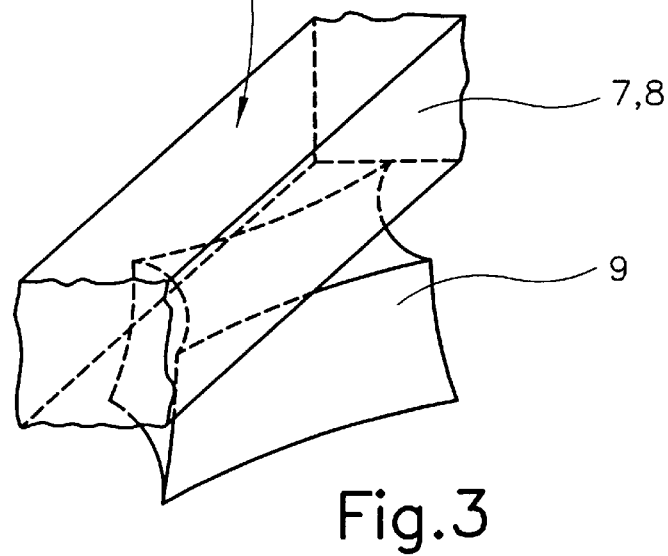

The arrangement of the support element (9) and the spring (7) is shown in FIG. 3.

Figure 13:
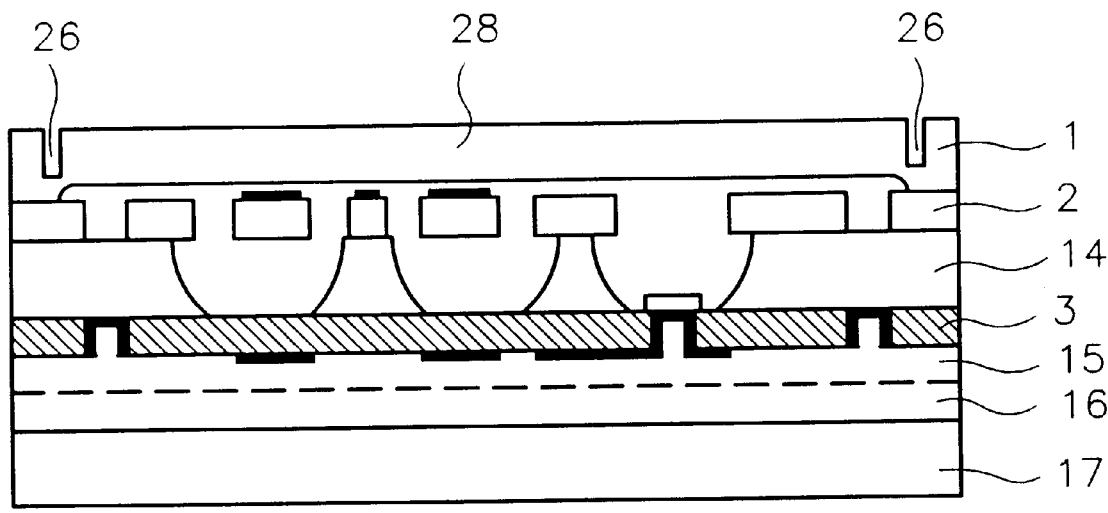

For reasons of clearness, FIG. 6 shows only a quarter of the respective area in the surrounding of a support element (9). Especially important here are the mirror edges (19) and the edge (18) of the mask (25). They limit the area (27) (gap between adjacent individual mirrors (6)) in which the wet-chemical etching attack occurs. The progression of the etching line is shown in FIG. 6 by the broken lines. The etching line on the edges (18 and 19) progresses in a straight line, whereas in the corners it continues in circular fashion. The etching time is set to undercut the individual mirrors (6) completely on the one hand and to create the support elements (9) from the remaining oxide layer (14) on the other hand (see also FIG. 3). After removing the mask (25), a glass wafer (1) is applied on the system by anodic bonding (FIG. 13).

Figure 14:
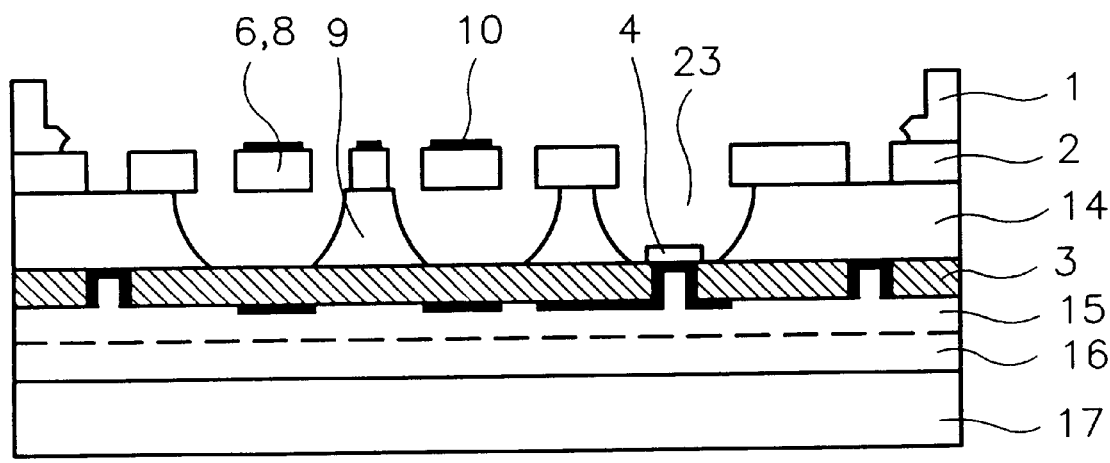

In preparation, the glass wafer (1) was sufficiently thinned in the area of the relevant chips to prevent any contact with the individual mirrors (6) during their excursion and the anodic bond process is restricted to the outer frame of the micromechanical mirror array. Furthermore the glass wafer (1) has been provided with predetermined breaking points (26) by means of a diamond saw according to FIG. 13. During the decollation with a diamond saw the glass wafer (1) has a protection function with regard to the cooling water. The preparation is finished with the removal of the inner parts of the glass windows (28) (FIG. 14).

The micromechanical mirror array has a surface of 4.5×4 mm$^2$ in one realization variant. It is formed by 84 individual mirrors (6). The individual mirror (6) is 50 μm wide and 4 mm long. To achieve a high grade of coverage of the active layer, the distance between the individual mirrors (6) is 3 μm.

We claim:

1. Micromechanical motion facility with the following characteristics:

a first semiconductor wafer (2), an oxide layer (14) on the first semiconductor wafer (2), where the first semiconductor wafer (2) is formed in such a way as to form arrays (5) of micromechanical, flexible, one-piece bandlike elements (6), which are arranged parallel to each other, one array (5) consists of at least one carrier and several elements (6), first bandlike electrodes are mounted on these elements (6) which simultaneously serve as reflection layer (10), these first bandlike electrodes are mounted on the oxide layer (14) on the opposing side of the first semiconductor wafer (2), and where at least one swivel bearing is integrated in the elements (6), a first electrical insulation layer (3) on the side of the oxide layer (14) across from the semiconductor wafer (2), where arranged on the first electrical insulation layer (3) corresponding to the edges of the elements (6) are at least one second electrode (11) as well as feeder lines (12) which serve as electrical connection between the second electrodes (11) and bondpads (4), the first electrical insulation layer (3) has windows (13, 20) for the bondpads (4) and for adjustment marks (22), which are located on the edge of the first semiconductor wafer (2), and where the windows (20) for the adjustment marks (22) have a layer of the second electrodes (11) and feeder lines (12), several support elements (9) created by purposeful undercutting of the elements (6) from the oxide layer (14) on the swivel bearings between the elements (6) and the first insulation layer (3), a second insulation layer (15) on the first insulation layer (3) and a second semiconductor wafer (17) with an oxide layer (16), where the oxide layer (16) of the second semiconductor wafer (17) is connected to the second insulation layer (15).

2. Micro swivel actuators, especially micromechanical mirror arrays according to patent claim 1, characterized by the swivel bearings being formed as springs (7).

3. Micro swivel actuators, especially micromechanical mirror arrays according to patent claim 2, characterized by the springs (7) in the direction of the swiveling axis of the flexible, one-piece bandlike electrodes (8), which are arranged parallel to each other being connected with the support elements (9), are at least one-sided, and with reference to the support elements (9) reciprocally arranged double-sided torsion springs.

4. Micro swivel actuators, especially micromechanical mirror arrays according to patent claim 2, characterized by the springs (7) being single or double coil springs spreading across to the flexible, one-piece bandlike electrodes (8), which are arranged parallel to each other.

5. Micro swivel actuators, especially micromechanical mirror arrays according to patent claim 2, characterized by the springs (7) being formed as membrane, flat-coil and cross-shaped springs.

6. Micro swivel actuators, especially micromechanical mirror arrays according to patent claim 1, characterized by a reflecting layer on the flexible, one-piece bandlike electrodes (8), which are arranged parallel to each other, and a bondable layer on the bondpads (4).

7. Micro swivel actuators, especially micromechanical mirror arrays according to patent claim 1, characterized by a layer of aluminum or an aluminum alloy on the flexible, one-piece bandlike electrodes (8), which are arranged parallel to each other, and on the bondpads (4).

8. Micro swivel actuators, especially micromechanical mirror arrays according to patent claim 1, characterized by metal layers of gold, silver, aluminum, an aluminum alloy and/or a dielectric stack of layers of titanium oxide/chromium oxide on the flexible, one-piece bandlike electrodes (8), which are arranged parallel to each other and of aluminum or an aluminum alloy on the bondpads (4).

9. Micro swivel actuators, especially micromechanical mirror arrays according to patent claim 1, characterized by the insulation layer (3) being an insulator resistant in hydrofluoric acid.

10. Micro swivel actuators, especially micromechanical mirror arrays according to patent claim 1, characterized by the insulation layer (3) consisting of silicon nitride.

11. Micro swivel actuators, especially micromechanical mirror arrays according to patent claim 1, characterized by the electrodes (11) and the feeder lines (12) being either made of a molybdenum-silicon, tungsten-silicon, tantalum-silicon or titanium-silicon compound.

12. Micro swivel actuators, especially micromechanical mirror arrays according to patent claim 1, characterized by the flexible, one-piece bandlike electrodes (8), which are arranged parallel to each other, being covered by a plate of transparent and reflection-reduced material.

13. Micro swivel actuators, especially micromechanical mirror arrays according to patent claim 10, characterized by the cover plate preferably being a glass wafer (1) which is thinned in the area opposing the flexible, one-piece bandlike electrodes (8), which are arranged in one piece and by this glass wafer having been provided with predetermined breaking points (26).

14. Procedures for the manufacturing of micromechanical motion facilities with the following steps:

oxidation of a surface of a first semiconductor wafer (2) to create a first oxide layer (14), application of a first electrical insulation layer (3) which is different from the first oxide layer (14) with regard to the etching resistance onto the first oxide layer (14) of the first semiconductor wafer (2), etching of windows (13, 20) for bondpads (4) and for adjustment marks (22) to be arranged on the edge of the semiconductor wafer into the first electrical insulation layer (3), application of an electrically conducting layer (21) onto the first electrical insulation layer (3) and into the openings of the windows (13, 20), etching of this electrically conducting layer (21) where the second electrodes (11) as well as the connection always between one of these second electrodes (11) and an opening of the window (13) are created, application of a second insulation layer (15), mounting of a second semiconductor wafer (17) covered with an oxide layer (16) and serving exclusively as a carrier onto the first semiconductor wafer (2), which permanently connects the oxide layer (16) of the second semiconductor wafer (17) with the second insulation layer (15), etching of the first semiconductor wafer (2), to create the openings (23, 24) to the adjustment marks (22) and to the bondpads (4) and to form the contours of the elements (6) with at least one swivel bearing, etching of an opening (23) into the first oxide layer (14), application of a metal layer serving as reflection layer (10) onto the elements (6) and manufacturing of the bondpads (4), and etching of the first oxide layer (14) with different etching lines where the elements (6) are completely undercut and where areas of the first oxide layer (14) remain between the insulation layer (3) and the swivel bearings as support elements (9) realized by circular progression on the edges of the etching lines), where the second electrodes (11) are arranged parallel to the edges of the elements (6).

15. Procedures according to patent claim 14, characterized by the oxide layer (14) serving as sacrificial layer manufactured from two semiconductor wafers, covered with an oxide layer by means of a silicon fusion bond process and the following removal of one of these semiconductor wafers.

16. Procedures according to patent claim 14, characterized by one glass wafer (1) being mounted onto the semiconductor wafer (2).

17. Procedures according to patent claim 14, characterized by the glass wafer (1) being connected with the semiconductor wafer (2) by anodic bonding.

18. Procedures according to patent claim 14, characterized by decollation of the micromechanical mirror arrays by sawing with a diamond saw.

* * * * *